United States Patent
Liu

(10) Patent No.: US 10,156,582 B2
(45) Date of Patent: Dec. 18, 2018

(54) BICYCLE PEDALING FREQUENCY SENSOR

(71) Applicant: SHENZHEN QIANHAI LIVALL IOT TECHNOLOGY CO., LTD., Shenzhen, Guangdong Province (CN)

(72) Inventor: Kenneth Liu, Shenzhen (CN)

(73) Assignee: ShenZhen QianHai Livall IOT Technology CO., LTD., ShenZhen, GuangDong Province (CN)

(*) Notice: Subject to any disclaimer, the term of this patent is extended or adjusted under 35 U.S.C. 154(b) by 31 days.

(21) Appl. No.: 15/127,791

(22) PCT Filed: Apr. 24, 2015

(86) PCT No.: PCT/CN2015/077363
§ 371 (c)(1),
(2) Date: Sep. 20, 2016

(87) PCT Pub. No.: WO2016/004780
PCT Pub. Date: Jan. 14, 2016

(65) Prior Publication Data
US 2017/0097375 A1    Apr. 6, 2017

(30) Foreign Application Priority Data
Jul. 11, 2014 (CN) .......................... 2014 1 0338595

(51) Int. Cl.
*G01P 15/08* (2006.01)
*G01P 1/02* (2006.01)
(Continued)

(52) U.S. Cl.
CPC ........ *G01P 15/0802* (2013.01); *G01C 22/002* (2013.01); *G01P 1/02* (2013.01); *G01P 3/44* (2013.01); *B62J 2099/002* (2013.01)

(58) Field of Classification Search
None
See application file for complete search history.

(56) References Cited

U.S. PATENT DOCUMENTS 4,526,036 A * 7/1985 Morrison ................ G01P 3/481
340/669
9,075,076 B2 * 7/2015 Baechler .................. B62J 99/00
(Continued)

FOREIGN PATENT DOCUMENTS

WO    WO2012052070 A1    4/2012
WO    WO2013155112 A1    10/2013

*Primary Examiner* — Clayton E Laballe
*Assistant Examiner* — Dennis Hancock
(74) *Attorney, Agent, or Firm* — Jeanette Meng Nakagawa

(57) ABSTRACT

The present disclosure is for a bicycle pedaling frequency sensor comprising a signal acquisition unit, a data transmission unit, and/or a data conversion unit. Pedaling frequency is obtained by recording and converting periodical changes of acceleration and/or of angular velocity in real time. This can be achieved by further incorporating a two axis, a three axis acceleration sensors, and/or gyroscope sensors. The pedaling frequency sensor communicates wirelessly with a computing terminal. It is powered and housed within the cavity of a shell, wherein the shell's outer surface is in thread fit with an inner surface of an expansion component. The expansion component allows the sensor to be inserted into and secured within hollow spaces on a bicycle's pedals and/or cranks.

7 Claims, 4 Drawing Sheets

(51) Int. Cl.
*G01P 3/44* (2006.01)
*G01C 22/00* (2006.01)
*B62J 99/00* (2009.01)

(56) References Cited

U.S. PATENT DOCUMENTS

| | | | | |
|---|---|---|---|---|
| 2013/0024137 A1* | 1/2013 | Grassi | ................ | G01L 3/108 |
| | | | | 702/43 |
| 2013/0289932 A1* | 10/2013 | Baechler | ............ | A61B 5/0002 |
| | | | | 702/141 |
| 2015/0053494 A1* | 2/2015 | Belon | ................ | G01B 7/30 |
| | | | | 180/206.3 |

* cited by examiner

BICYCLE PEDALING FREQUENCY SENSOR

FIELD OF THE INVENTION

The present invention relates to a motion data acquisition sensor, and particularly relates to a sensor for acquiring pedaling frequency when a bicycle moves.

BACKGROUND OF THE INVENTION

During motion like running and riding a bicycle, the motion performance is recorded and analyzed by acquiring important motion data such as pedaling frequency, so that an appropriate motion plan can be formulated.

The existing sensor (also referred to as a pedaling frequency sensor) for acquiring bicycle pedaling frequency mainly acquires pedaling frequency data by adopting the induction principle in a way that a magnet is matched with a Hall element counter or an induction coil counter. The pedaling frequency sensor can acquire corresponding data by mutual motion coordination between two separated components, wherein at least one component needs to be fixed on a frame, the other component needs to be fixed on a crank linked with a middle axle, and the two components need to rotate synchronously. The existing bicycle does not provide a position for firmly fixing the pedaling frequency sensor, so corresponding components are generally fixed at corresponding positions of the bicycle via bandage, and the two components in matching induction shift after long-time motion to influence the stability.

SUMMARY OF THE INVENTION

The technical problem mainly solved by the present invention is to provide a bicycle pedaling frequency sensor. The bicycle pedaling frequency sensor can accurately acquire the pedaling frequency in real time when a bicycle moves, and is compact in structure, stable and reliable. A bicycle adopting the pedaling frequency sensor is convenient to install and unlikely to loosen, and the acquired data is reliable.

In order to solve the above technical problems, the present invention provides a bicycle pedaling frequency sensor, including a signal acquisition unit arranged on a circuit board and used for acquiring motion acceleration changes or/and angular velocity changes in different rotation directions of a middle axle in real time, a data transmission unit for transmitting the acquired data to a terminal, and a power supply for supplying power to the signal acquisition unit and the data transmission unit to work.

Further, a data conversion unit for converting the change data of acceleration or/and angular velocity into a rotation number is also arranged on the circuit board, and the input end and the output end of the data conversion unit are connected with the signal acquisition unit and the data transmission unit respectively.

Further, the signal acquisition unit includes a two-axis or three-axis acceleration sensor for acquiring motion acceleration.

Further, the signal acquisition unit also includes a three-axis gyroscope sensor for acquiring angular velocity.

Further, the data transmission unit includes a WIFI unit or a Bluetooth unit.

Further, the pedaling frequency sensor further includes a shell with a hollow end and an expansion component in threaded fit with the shell, a circuit board integrating circuits and components and a battery are arranged in the hollow shell, and a cover enabling the circuit board and the battery to form an electrical circuit is arranged at the end of the shell.

Further, the expansion component is provided with a trapezoidal through hole along the central axis thereof, threads matched with the shell are formed on the wall of the through hole, and at least one expansion port for communicating the interior with the exterior of the through hole is formed in the wall of the through hole.

Further, 2-4 expansion ports are formed, and are uniformly distributed in the wall of the through hole.

The bicycle pedaling frequency sensor of the present invention includes a signal acquisition unit arranged on a circuit board and used for acquiring motion acceleration changes or/and angular velocity changes in different rotation directions of a middle axle in real time, a data transmission unit for transmitting the acquired data to a terminal, and a power supply for supplying power to the signal acquisition unit and the data transmission unit to work. When in use, the pedaling frequency sensor is fixed on the hollow middle axle of a bicycle, and the middle axle, a crank and pedals of the bicycle rotate synchronously; during riding motion, acceleration change or/and angular velocity change data is acquired in real time and transmitted to the corresponding processing terminal via the data transmission unit for processing, real-time rotating frequency of the middle axle of the bicycle is obtained, then pedaling frequency data during riding can be determined, and pedaling frequency data is acquired when the bicycle moves. Because the pedaling frequency sensor skillfully implements counting through periodical changes of acceleration or/and angular velocity data and other data when the bicycle moves and does not need to carry out counting in a sensing mode through periodical relative motion between two separated components, the pedaling frequency sensor is simple in structure, small in size and works stably and reliably. After the middle axle with a hollow structure for reducing the weight is installed in the existing bicycle, no obvious components are exposed, and a loosening phenomenon does not appear. The pedaling frequency sensor can be applied to all bicycles with hollow middle axles, and thus has better generality.

DESCRIPTION OF THE DRAWINGS

To illustrate the technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by the persons of ordinary skill in the art without any creative effort.

DETAILED DESCRIPTION OF PREFERRED EMBODIMENTS

To make the objectives, technical solutions and advantages of the present invention clearer, the technical solutions in the embodiments of the present invention will be clearly and completely described below in combination with the accompanying drawings in the embodiments of the present invention. Apparently, the embodiments described below are a part, but not all, of the embodiments of the present invention. All of other embodiments, obtained by those of ordinary skill in the art based on the embodiments of the present invention without any inventive efforts, fall into the protection scope of the present invention.

Figure 1:
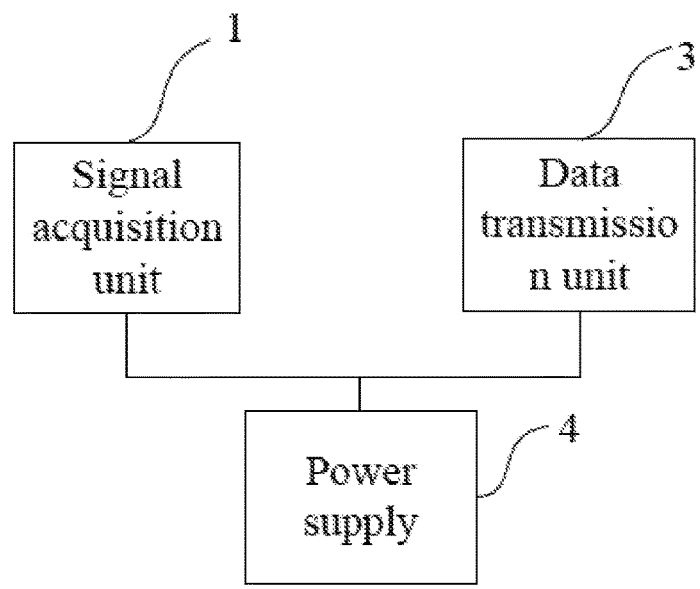
FIG. 1 is a principle block diagram of an embodiment of a pedaling frequency sensor of the present invention.

As shown in FIG. 1, the present invention provides an embodiment of a bicycle pedaling frequency sensor.

The bicycle pedaling frequency sensor includes: a signal acquisition unit 1 arranged on a circuit board and used for acquiring motion acceleration changes or/and angular velocity changes in different rotation directions of a middle axle in real time, a data transmission unit 3 for transmitting the acquired data to a terminal, and a power supply 4 for supplying power to the signal acquisition unit 1 and the data transmission unit 3 to work.

Specifically, the circuit board provided with circuits is arranged in a shell, the signal acquisition unit 1 for acquiring acceleration changes or/and angular velocity changes in different motion directions is arranged on the circuit board, the data transmission unit 3 transmits the data of acceleration changes or/and angular velocity changes acquired by the signal acquisition unit 1 to the terminal for processing in real time, and the pedaling frequency during riding is output or recorded to facilitate acquisition and utilization.

The data transmission unit 3 includes a wireless transmission unit or a wired transmission unit. Since the bicycle pedaling frequency sensor rotates along with the middle axle during riding, it had better adopt a WIFI unit, a Bluetooth unit or other short-distance wireless transmission unit to transmit data.

When the signal acquisition unit 1 acquires acceleration data in different directions during bicycle motion, the signal acquisition unit 1 includes a two-axis or three-axis acceleration sensor, wherein when the two-axis sensor is installed, the rotating plane must be consistent with a plane formed by the two axes of the sensor, whereas the three-axis sensor is not limited thereto.

When in use, the pedaling frequency sensor is fixed with the middle axle of the bicycle and rotates synchronously; when the middle axle rotates, the position of the pedaling frequency sensor is changed, and the gravitational acceleration value of the corresponding acceleration sensor in different directions of the rotating plane is also changed; when a user rides the bicycle, the middle axle rotates periodically; thus, the rotating frequency of the middle axle can be obtained via periodical changes of the gravitational acceleration acquired by the acceleration sensor in different directions of the rotating plane according to the time required for rotating one cycle, that is, acquisition of pedaling frequency data is realized.

When the signal acquisition unit 1 acquires angular velocity change data in different directions when the bicycle moves, the signal acquisition unit 1 includes a three-axis gyroscope sensor. When in use, the pedaling frequency sensor rotates synchronously with the middle axle, the three-axis gyroscope sensor can output the angular velocity of the rotating pedaling frequency sensor during the rotation of the rotating pedaling frequency sensor, the rotating angle change data can be calculated according to the angular velocity, and when the middle axle rotates one cycle, the three-axis gyroscope sensor also synchronously rotates one cycle, that is, 360 degrees, the time required for rotating 360 degrees can be converted into pedaling frequency to realize acquisition of pedaling frequency data when the bicycle moves.

When in use, the pedaling frequency sensor is fixed on the hollow middle axle of the bicycle, and the middle axle rotates synchronously with pedals; and when the bicycle moves, gravitational acceleration or/and angular velocity change data is detected and transmitted to the corresponding terminal via the data transmission unit for processing to obtain corresponding pedaling frequency data, and the pedaling frequency data is acquired when the bicycle moves. Because the pedaling frequency sensor skillfully implements counting through periodical changes of acceleration or/and angular velocity data and other data and does not need to carry out counting in a sensing mode through periodical relative motion between two separated components, the pedaling frequency sensor is simple in structure, dustproof, waterproof and works stably and reliably. Since the middle axle of the existing bicycle is provided with a hollow structure in order to reduce the weight during installation, no obvious components are exposed, and a loosening phenomenon does not appear. Meanwhile, the pedaling frequency sensor can be applied to all bicycles with hollow middle axles, and thus has better generality.

In this embodiment, the power supply 4 is a button cell. Since the pedaling frequency sensor carrying the power supply periodically rotates during working, on the one hand, it is inconvenient to supply power via an external power supply; and on the other hand, a power output line does not need to be reserved, so the pedaling frequency sensor is convenient to install.

Figure 2:
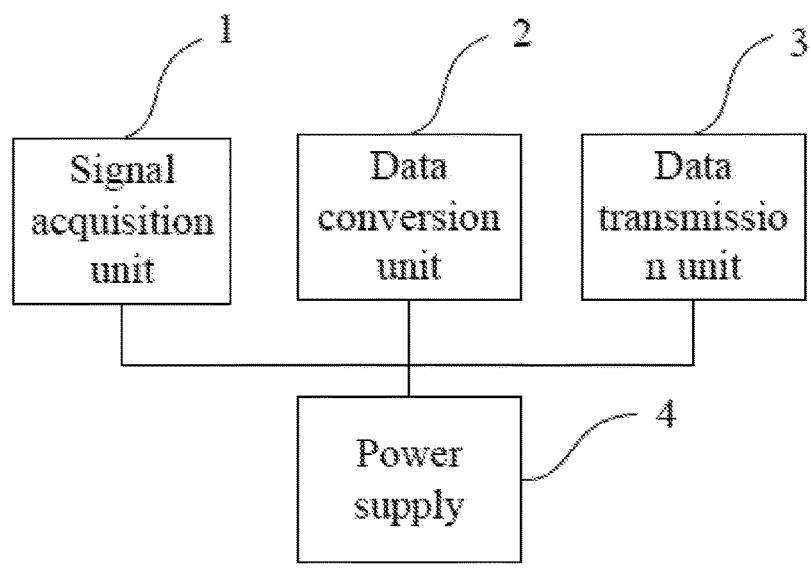
FIG. 2 is a principle block diagram of an embodiment of another pedaling frequency sensor of the present invention.

As shown in FIG. 2, the present invention further puts forward another embodiment based on the above embodiment.

The pedaling frequency sensor further includes a data conversion unit 2 arranged between the signal acquisition unit 1 and the data transmission unit 3, the data conversion unit 2 converts the signals acquired by the signal acquisition unit 1 into data corresponding to the bicycle pedaling frequency and outputs the data, the data is transmitted to the corresponding processing terminal such as a smart phone with processing software or the like via the data transmission unit 3, bicycle pedaling frequency data can be obtained via necessary processing, and other units and the data processing mode are not changed. In this embodiment, real-time bicycle pedaling frequency can be directly obtained by the mobile terminal equipped with necessary processing software, and the mobile terminal should not be a special device or a dedicated computer application program.

Figure 3:
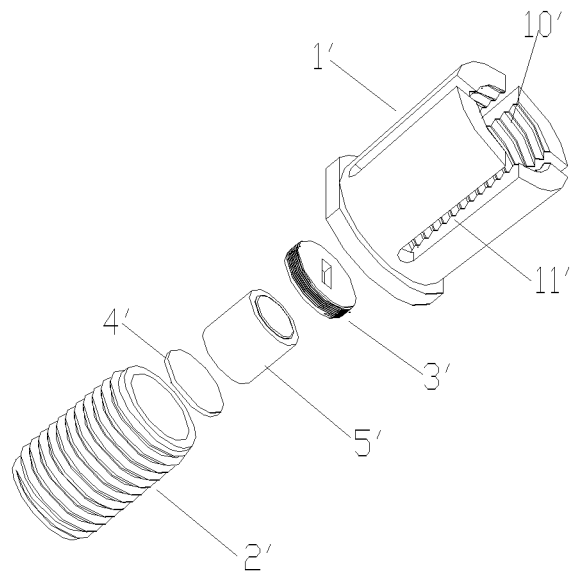
FIG. 3 is a structural schematic diagram of an embodiment of a pedaling frequency device of the present invention.
Figure 4:
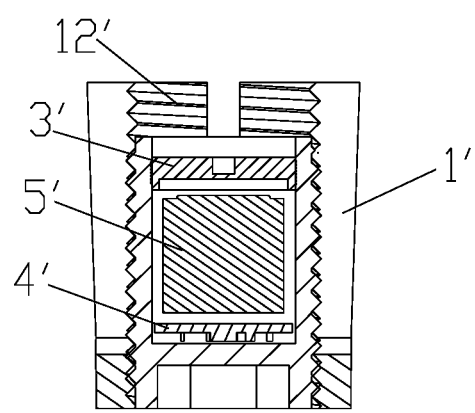
FIG. 4 is a sectional structural schematic diagram of the pedaling frequency device of the present invention in the axial direction.

As shown in FIG. 3 and FIG. 4, the pedaling frequency sensor further includes a shell 2' with a hollow end and an expansion component 1' in threaded fit with the shell 2', a circuit board 4' integrating circuits and components and a battery 5' are arranged in the hollow shell 2', and a cover 3' enabling the circuit board 4' and the battery 5' to form an electrical circuit is arranged at the end of the shell 2'.

Specifically, circuits and components of the pedaling frequency sensor are integrated on the circuit board 4', the circuit board 4' and the battery 5' are arranged in the shell 2' with the hollow end, the cover 3' enabling the circuit board 4' and the battery 5' to form an electrical circuit is arranged at the end of the shell 2', and the shell 2' is in threaded fit with the expansion component 1'.

The expansion component 1' is provided with a trapezoidal through hole 10' along the central axis thereof, threads 12' matched with the shell 2' are formed on the wall of the through hole, and at least one expansion port 11' for communicating the interior with the exterior of the through hole 10' is formed in the wall of the through hole. That is, the expansion component 1' is provided with a trapezoidal internal thread structure along the central axis thereof, and the internal threads are matched with external threads 22' on the shell 2. The expansion component 1' is provided with at least one expansion port 11'; when the number of the expansion ports 11' is two or more, the expansion ports 11' are uniformly distributed in the wall of the through hole; and 2-5 expansion ports 11' are appropriate according to the cost and the production process.

Figure 5:
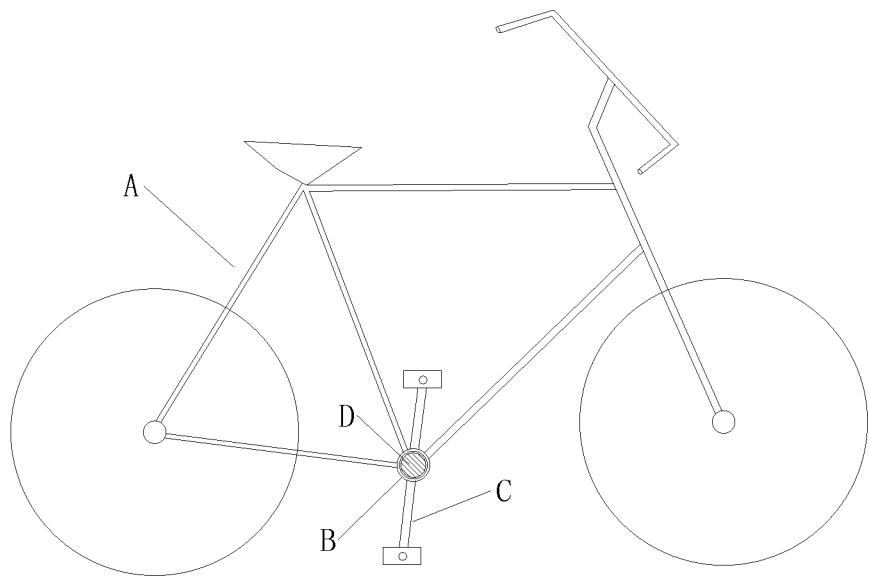
FIG. 5 is a schematic diagram of a matching fixed structure of the pedaling frequency sensor of the present invention and a bicycle.

As shown in FIG. 5, when in use, the expansion component 1' in the pedaling frequency sensor D is placed in the hollow middle axle B of a bicycle, the shell 2' is rotated to move towards the interior of the expansion component 1', the shell 2' is extruded outwards by the expansion component 1' in the inward moving process because the axial section of the shell 2' is of a trapezoidal structure having a big end and a small end, the outer wall of the expansion component 1' is extruded and fastened with the middle axle under the coordination of the expansion ports 11', and then the pedaling frequency sensor is well fixed without loosening; and the shell 2' is nearly concealed in the middle axle after fixing, so the pedaling frequency sensor can be conveniently fixed without reconstruction of the structure of the bicycle.

Figure 6:
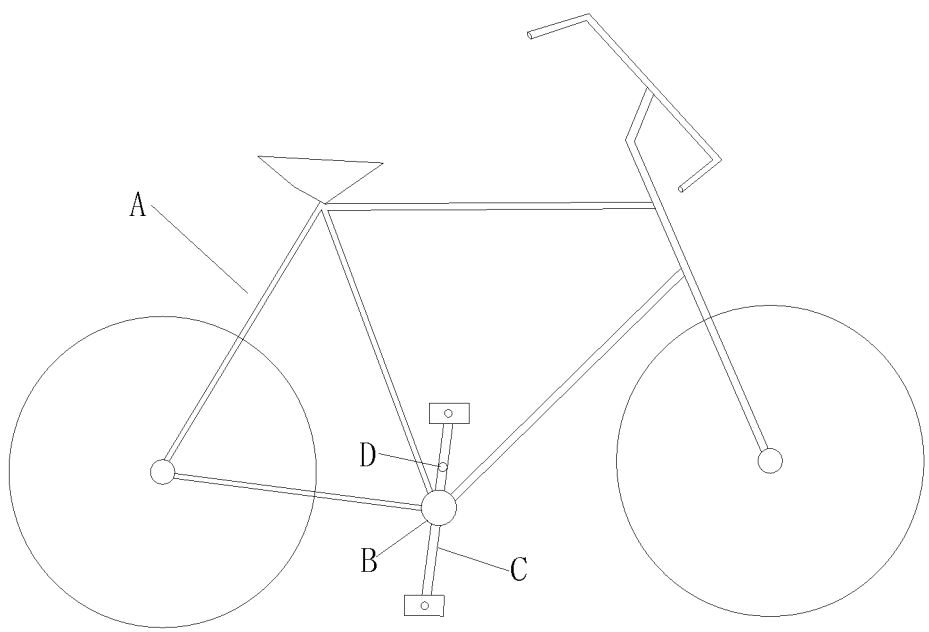
FIG. 6 is another schematic diagram of a matching fixed structure of the pedaling frequency sensor of the present invention and a bicycle.
Figure 7:
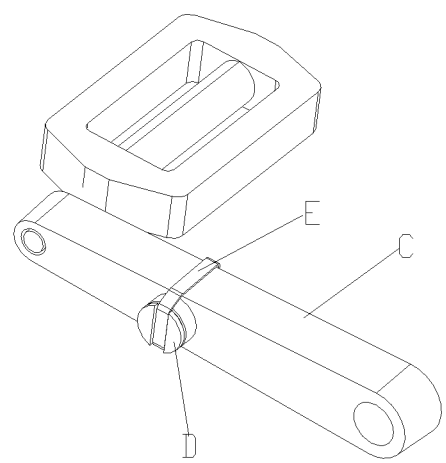
FIG. 7 is a structural enlarged schematic diagram of the matching position in FIG. 6.

As shown in FIG. 6 and FIG. 7, because the pedaling frequency sensor D obtains pedaling data during riding via a two-axis or three-axis acceleration sensor or a three-axis gyroscope sensor for acquiring angular velocity without interaction between two separated components, it can have a thickness of 5-10 MM and a diameter within 3 CM. When the middle axle to be installed of the bicycle is of a solid structure, that is, when the bicycle is a common bicycle, the pedaling frequency sensor D is fixed on a bicycle crank C via a bandage E. The pedaling frequency can be determined by detecting the rotating frequency of the crank during working. The pedaling frequency sensor with small size does not influence the use of the bicycle. The above embodiments are merely used for illustrating the technical solutions of the present invention, rather than limiting the present invention; though the present invention is illustrated in detail with reference to the aforementioned embodiments, it should be understood by those of ordinary skill in the art that modifications may still be made on the technical solutions recorded in the aforementioned respective embodiments, or equivalent alterations may be made to a part of technical features thereof; and these modifications or alterations do not make the essence of the corresponding technical schemes depart from the spirit and scope of the technical schemes of the respective embodiments of the present invention.

What is claimed is:

1. A bicycle pedaling frequency sensor, comprising:
    a shell with a hollow cavity and an outer surface in thread fit with an inner surface of an expansion component, wherein the expansion component further assumes a trapezoidal profile with a base and an opening, with at least one expansion port cut from the opening towards the base along a central axis thereof;
    a signal acquisition unit configured onto a circuit board housed within the hollow cavity of the shell to acquire motion acceleration and/or angular velocity signals during rotation of a middle axle,
    a data transmission unit to transmit acquired signal outputs to a computing terminal, and
    a power supply.

2. The bicycle pedaling frequency sensor of claim 1 further comprises a data conversion unit configured onto the circuit board between the signal acquisition unit and the data transmission unit, wherein the data conversion unit translates acceleration and angular velocity signals into pedaling frequencies.

3. The bicycle pedaling frequency sensor of claim 1, wherein
    the signal acquisition unit further comprises a two-axis and/or a three-axis acceleration sensor to acquire motion acceleration signals.

4. The bicycle pedaling frequency sensor of claim 3, wherein
    the signal acquisition unit further comprises a three-axis gyroscope sensor to acquire angular velocity signals.

5. The bicycle pedaling frequency sensor of claim 1, wherein
    the data transmission unit communicates wirelessly with the computing terminal.

6. The bicycle pedaling frequency sensor of claim 1, wherein the circuit board and the power supply housed within the cavity of the shell are secured onto the base of the expansion component by a cover.

7. The bicycle pedaling frequency sensor of claim 1, wherein
    the expansion component further comprises a plurality of expansion ports uniformly distributed around its circumference.

* * * * *